United States Patent

Takada

[11] 4,225,178
[45] Sep. 30, 1980

[54] VEHICLE SEAT

[76] Inventor: Juichiro Takada, 3-12-1, Shinmachi Setagayaku, Tokyo, Japan

[21] Appl. No.: 30,064

[22] Filed: Apr. 16, 1979

[30] Foreign Application Priority Data

May 26, 1978 [JP] Japan .................. 53/062309

[51] Int. Cl.² .......................................... B60R 21/10
[52] U.S. Cl. .................................. 297/216; 248/561; 248/563
[58] Field of Search ............... 297/216, 452; 248/561, 248/563

[56] References Cited
U.S. PATENT DOCUMENTS

| | | | |
|---|---|---|---|
| 2,660,222 | 11/1953 | Woodsworth | 297/216 |
| 2,922,461 | 1/1960 | Braun | 297/216 |
| 3,065,828 | 11/1962 | Caldemeyer | 248/561 X |
| 3,797,798 | 3/1974 | Magruder | 248/561 |
| 3,897,101 | 7/1975 | Hess | 297/216 |

Primary Examiner—Francis K. Zugel
Attorney, Agent, or Firm—Brumbaugh, Graves, Donohue & Raymond

[57] ABSTRACT

A vehicle seat has a rigid seat support plate which is spring-mounted for vertical movement on the frame and becomes locked in the event of a collision by a pendulum actuated ratchet and pawl mechanism to prevent a "plunging" or "submarining" effect.

7 Claims, 4 Drawing Figures

U.S. Patent  Sep. 30, 1980  4,225,178
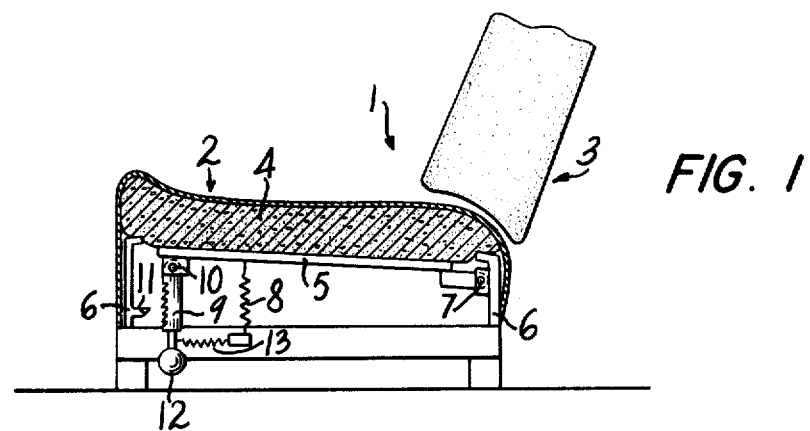
FIG. 1
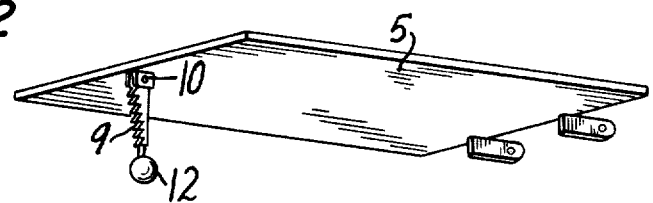
FIG. 2
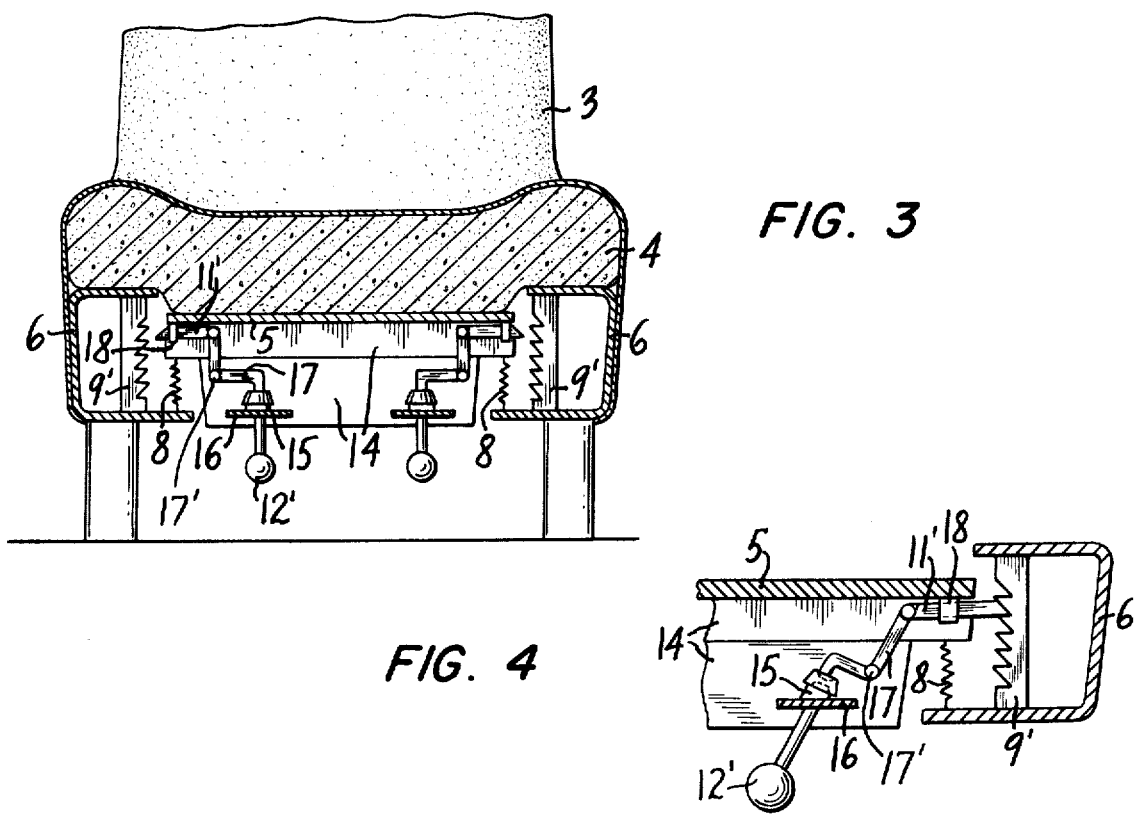
FIG. 3
FIG. 4

VEHICLE SEAT

FIELD OF THE INVENTION

This invention relates to a vehicle seat which has a lockable support plate for preventing a "plunging" or "submarining" effect in the event of a collision.

BACKGROUND OF THE INVENTION

The seat belt systems used almost universally in automobile and other road vehicles for passenger protection in an emergency, such as a collision or abrupt stop, keep the passsenger from being thrown forward. In some types of emergency, however, the passenger is not only thrown forward but is thrust down on the seat, an occurrence that can be termed a "plunging" or "submarining" effect. In other words, although the seat belt system restrains forward and upward motion of the passenger, it does not restrain downward motion, so if the vehicle rapidly accelerates upwardly, the inertia of the passenger creates the plunging effect; the passenger abruptly moves down relative to the seat, a situation that is readily permitted by the soft, spring and foam-cushioned seats conventionally used in road vehicles. The relative downward movement of the passenger has at least two possible adverse results. First, the seat belt system is, in effect, loosened, thus increasing the degree of relative forward movement as compared to what would be possible without a plunging effect. Second, the shoulder belt rests higher than is desirable and may even catch the passenger's neck, a very dangerous situation.

One way of avoiding or mitigating the plunging effect is to provide a very stiff and hard seat, and vehicle seats have been made in the form of a contoured steel plate covered with a thin foam cushion. Unfortunately, though this type of seat is probably safer than the conventional soft, springy seats, it is very uncomfortable and, therefore, is commercially and practically unacceptable as a replacement for conventional vehicle seats.

SUMMARY OF THE INVENTION

There is provided, in accordance with the present invention, a vehicle seat which is comfortably padded and sprung but which greatly reduces the plunging effect by means of an inertially locked seat support plate under the seat cushion. More particularly, a vehicle seat, according to the invention, has a vertically movable, spring-supported, rigid seat support plate which is generally coextensive with the load-carrying part of the seat and a selectively engageable ratchet and pawl device interposed between the seat support plate and the seat frame which locks the plate against movement in the event of a collision or other emergency. The ratchet and pawl are engaged by an inertia-responsive device, such as a pendulum affixed to, or connected by a linkage to, either the pawl or the ratchet. When so engaged, the seat support plate becomes non-movable, and downward plunging of the passenger is limited to a relatively small amount permitted by the seat cushion.

For a better understanding of the invention, reference may be made to the following description of exemplary embodiments, taken in conjunction with the figures of the accompanying drawings.

DESCRIPTION OF THE DRAWINGS

FIG. 1 is a side view in cross section in schematic form of one embodiment of the invention;

FIG. 2 is a pictorial view of the seat support plate and the associated ratchet of the embodiment of FIG. 1;

FIG. 3 is a front cross-sectional view in generally schematic form of another embodiment of the invention; and FIG. 4 is a fragmentary front cross-sectional view of a portion of the embodiment of FIG. 3 shown on a larger scale.

DESCRIPTION OF EXEMPLARY EMBODIMENTS

The embodiment of a vehicle seat 1, according to the invention, shown in FIGS. 1 and 2, comprises a seat portion 2 and a back portion 3. The seat portion 2 includes a peripheral frame 6 which defines a relatively large opening at the upper portion, such opening corresponding generally to the part of the seat portion on which a passenger sits and by which he is supported. A seat support plate 5 substantially fills the opening in the frame 6. The seat support plate 5 is stiff and rigid, is preferably made of steel, may be contoured for comfort and has laterally spaced apart hinges 7. Springs 8 suitably installed between the frame and a forwardly located portion of the seat support 5 resiliently support the seat support plate 5, while permitting pivotal movement of the plate about the hinges 7 under the variable normal forces imposed on the seat by a person sitting in a moving vehicle. An elastic form cushion 4 rests on the frame and the seat support plate 5. The resiliency of the foam cushion 4 and the springs 8 provide excellent riding comfort for the vehicle passenger.

A tooth 11 extends generally rearwardly from a front member of the frame 6. The tooth 11 serves generally the function of a pawl in that it is engageable by one of a series of complementary ratchet teeth on a ratchet member 9 which hangs from the underside of the seat support plate 5 by means of a pivot pin 10. A weight 12 is attached to the lower end of the ratchet member 9 and the ratchet member and weight together constitute a pendulum in that they hang from a pivot and are responsive to inertia. The pendulum is lightly restrained from moving forward by a spring 13.

In the event of a collision, the inertia of the pendulum responds to the deceleration of the vehicle by swinging forwardly against the restraining force of the spring 13, and one of the ratchet teeth on the pendulum will engage the pawl 11. Such engagement will lock the seat support 5 against pivoting downwardly about the hinges 7, and a plunging or submarining motion of the passenger is limited to the relatively small amount permitted by the elastic foam cushion. The plunging motion which would be permitted by the supporting springs 8, were it not for the locking action of the pawl and ratchet, is prevented.

The embodiment of FIGS. 3 and 4 is similar in construction and principle of operation to the embodiment of FIGS. 1 and 2 in that it includes a seat support plate 5 mounted so that the forward portion can pivot about hinges along the rearward end and resiliently supported by springs 8 near the front. The locking system comprises a pair of fixed ratchet members 9', one of which is located adjacent either side and near the front of the support plate 5. Each ratchet member cooperates with a pawl 11' which is attached by a pivot pin to a link 17 and is guided to move generally laterally by a pawl-guide member 18. A pendulum 12' hangs by means of a head or cap portion 15 from an arm 16 extending out from a bracket 14 affixed underneath the seat support 5.

The two pawl and pendulum actuating systems, one associated with each ratchet member, are virtually identical, except one is right-handed and the other is left-handed, and each responds similarly to a sudden deceleration of the vehicle in the event of a collision or other emergency. Each pendulum and pawl system in the embodiments of FIGS. 3 and 4 responds to a deceleration of the vehicle seat in any direction, inasmuch as each pendulum 12' is supported by the head portion 15 for universal pivoting. Each link 17 pivots about a pin 17' in response to a camming action of the head 15 of the corresponding pendulum working against a follower surface on the lower leg of the link 17 which engages the head 15 of the pendulum 12'.

In response to a deceleration in any direction, the two pendulums 12' will swing, due to inertia, in a direction generally opposed to the predominant direction of deceleration. The camming action between each pendulum and the associated link 17 causes the link to pivot in a direction moving the upper portion generally outwardly, thereby pushing the corresponding pawl 11' out into engagement with a tooth of the adjacent ratchet member 9'. Both pairs of pawls and ratchets will thus lock the forward part of the seat against downward movement, and the plunging or submarining effect is prevented.

Thus, there is provided, in accordance with the present invention, a vehicle seat which provides good comfort for the passenger while at the same time preventing the plunging effect. Various modifications of the above-described embodiments can be made without departing from the principle of the invention. For example, the seat support plate can be pivoted from the front end and supported on springs adjacent the rear end, the pendulum actuated ratchet and pawl members being correspondingly relocated to the rear. Similarly, instead of pivoting the seat support plate, it can be mounted on the frame in guides which allow it to translate up and down on several supporting springs and locked by locking mechanisms suitably located for stable locking. The above-described embodiments show examples of reversing the locations of the ratchet and pawl, as between the seat support and the frame.

The modifications described above, as well as other modifications and variations which are apparent to those skilled in the art, are intended to be included within the scope of the invention, as defined in the appended claims.

I claim:

1. A vehicle seat comprising a frame adapted to be mounted on a vehicle body; a substantially rigid seat support plate mounted on the frame for generally vertical movement of at least a portion thereof relative to the frame, the support plate having a supporting surface generally coextensive with the seat-supported part of a person seated on the vehicle seat; at least one spring means for resiliently supporting the support plate and a person seated thereon; a cooperating ratchet and pawl device associated with the seat frame and the support plate and selectively engageable to lock the support plate against downward movement relative to the frame; and pendulum means associated with the ratchet and pawl device and inertially responsive to an abrupt change in the velocity of the vehicle for engaging the ratchet and pawl.

2. A seat according to claim 1 wherein the seat is hinged along one edge to pivot about an axis oriented transversely of the vehicle.

3. A seat according to claim 1 or claim 2 and further comprising a cushion of a resilient foam material on the seat support.

4. A seat according to claim 1 or claim 2 wherein the ratchet and pawl mechanism includes a pawl affixed to the frame and a ratchet member pivotably attached to the seat support in a position such that it normally is clear of the pawl but can swing forward to engage the pawl, and the pendulum means is a weight affixed to a lower portion of the ratchet member.

5. A seat according to claim 4 wherein the pendulum means further includes a spring resiliently urging the ratchet member in a direction away from the pawl.

6. A seat according to claim 1 or claim 2 wherein the ratchet is affixed to the frame and the pawl is mounted on the seat support for movement into engagement with the ratchet by the pendulum means.

7. A seat according to claim 6 wherein the pawl is affixed to a linkage on the seat support, and the pendulum means includes a weight carried by a universal support and having a camming portion engaging the linkage upon movement in any direction for engaging the pawl with the ratchet in response to a rapid change in the velocity of the vehicle in any direction.

* * * * *